United States Patent
Bohnengel

(10) Patent No.: US 12,484,558 B2
(45) Date of Patent: Dec. 2, 2025

(54) MEASURING FISH STRINGER

(71) Applicant: Perfect Measuring Tape Company, Phoenix, OR (US)

(72) Inventor: Andrew Barrett Bohnengel, Ashland, OR (US)

(73) Assignee: PERFECT MEASURING TAPE COMPANY, Phoenix, OR (US)

( * ) Notice: Subject to any disclaimer, the term of this patent is extended or adjusted under 35 U.S.C. 154(b) by 85 days.

(21) Appl. No.: 18/434,181

(22) Filed: Feb. 6, 2024

(65) Prior Publication Data

US 2025/0248375 A1 Aug. 7, 2025

(51) Int. Cl.
*A01K 65/00* (2006.01)
*G01B 3/1084* (2020.01)

(52) U.S. Cl.
CPC ............ *A01K 65/00* (2013.01); *G01B 3/1084* (2013.01)

(58) Field of Classification Search
CPC ...................................... A01K 65/00
USPC .................................. 224/103; 43/54.1, 4, 6
See application file for complete search history.

(56) References Cited

U.S. PATENT DOCUMENTS

| | | | | |
|---|---|---|---|---|
| 927,840 A * | 7/1909 | Dineen | ................... | A01K 65/00 224/103 |
| 1,176,177 A * | 3/1916 | Sparks | ................... | A01K 65/00 224/103 |
| 1,350,390 A * | 8/1920 | Stein | ..................... | A01K 65/00 224/103 |
| 2,536,531 A * | 1/1951 | Bishop | ................... | A01K 65/00 224/103 |
| 2,734,671 A * | 2/1956 | Adams | ................... | A01K 65/00 224/103 |
| 2,760,700 A * | 8/1956 | Lien | ......................  | A01K 65/00 224/103 |
| 3,302,837 A * | 2/1967 | Montgomery | ......... | A01K 65/00 224/103 |
| 3,387,753 A * | 6/1968 | Bowman | ................ | A01K 65/00 224/103 |
| 4,960,231 A * | 10/1990 | Popovich | ............... | A01K 65/00 224/103 |
| 6,772,924 B2 * | 8/2004 | Bennett | .................. | A01K 65/00 224/103 |
| 6,817,110 B2 * | 11/2004 | Bohnengel | ........... | G01B 3/1056 33/759 |
| 7,020,978 B1 * | 4/2006 | Nelson | ................... | B43L 7/005 33/759 |

(Continued)

*Primary Examiner* — Justin M Larson
(74) *Attorney, Agent, or Firm* — Shumaker, Loop & Kendrick, LLP; James D. Miller

(57) ABSTRACT

A fish stringer includes a spear having a tip for piercing a portion of a fish and a measuring tape pivotally coupled to the spear and including measurement markings thereon. The spear includes an axially extending channel formed therein. At least a portion of the measuring tape extends through the portion of the fish following passage of the spear through the portion of the fish. The measuring tape is adjustable between a first configuration and a second configuration. The first configuration includes a proximal portion of the measuring tape received within the channel and extending in the axial direction of the spear and the second configuration includes the proximal portion of the tape pivoted away from the channel to extend transversely relative to the axial direction of the spear.

9 Claims, 3 Drawing Sheets

(56) References Cited

U.S. PATENT DOCUMENTS

| | | | |
|---|---|---|---|
| 7,407,069 B1 * | 8/2008 | Trafas | A01K 65/00 224/103 |
| 2003/0141326 A1 * | 7/2003 | Bennett | A01K 65/00 224/103 |
| 2004/0140331 A1 * | 7/2004 | Yarbrough | A01K 65/00 224/103 |
| 2012/0324751 A1 * | 12/2012 | Wakeman | A01K 97/00 33/759 |

* cited by examiner

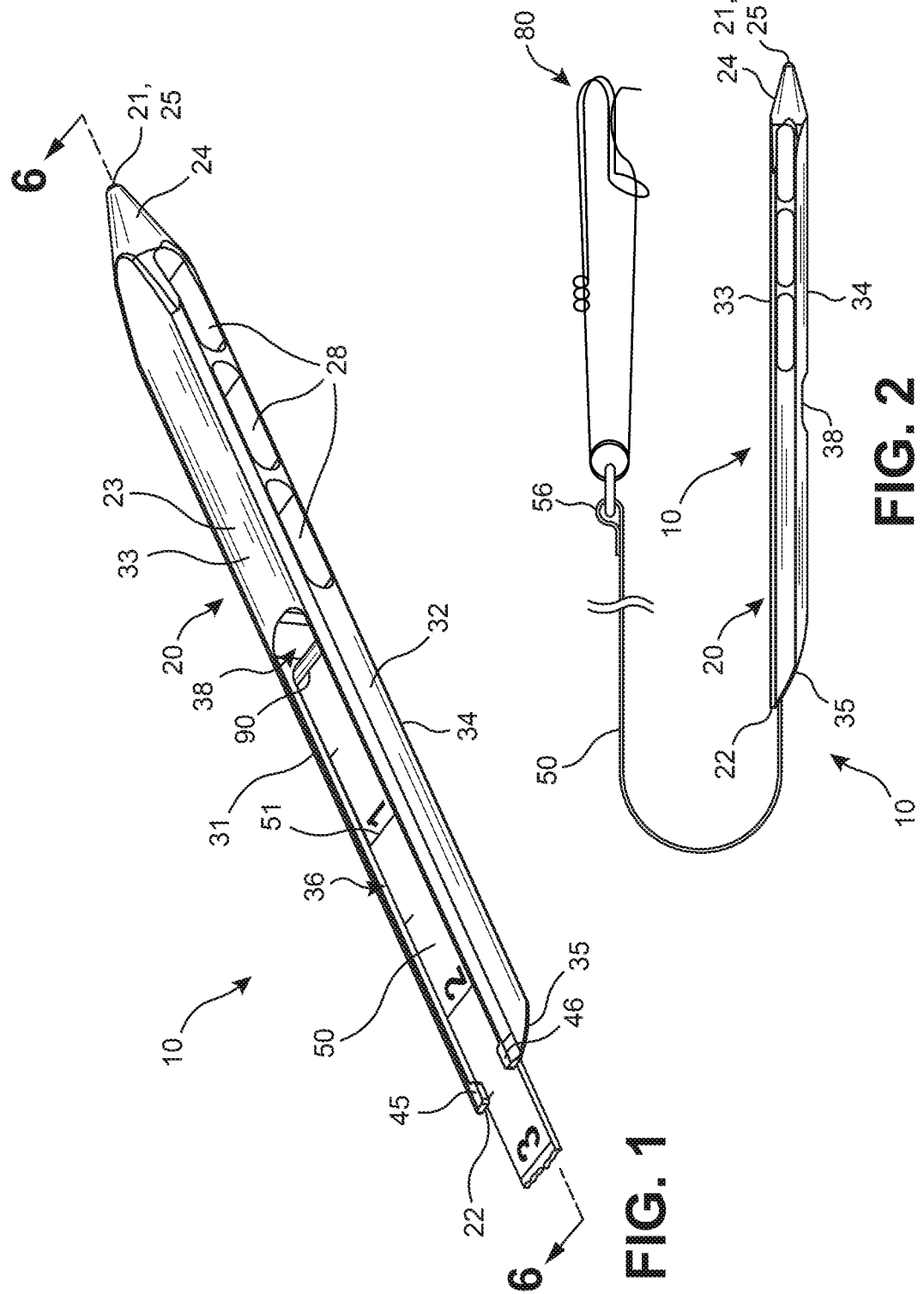

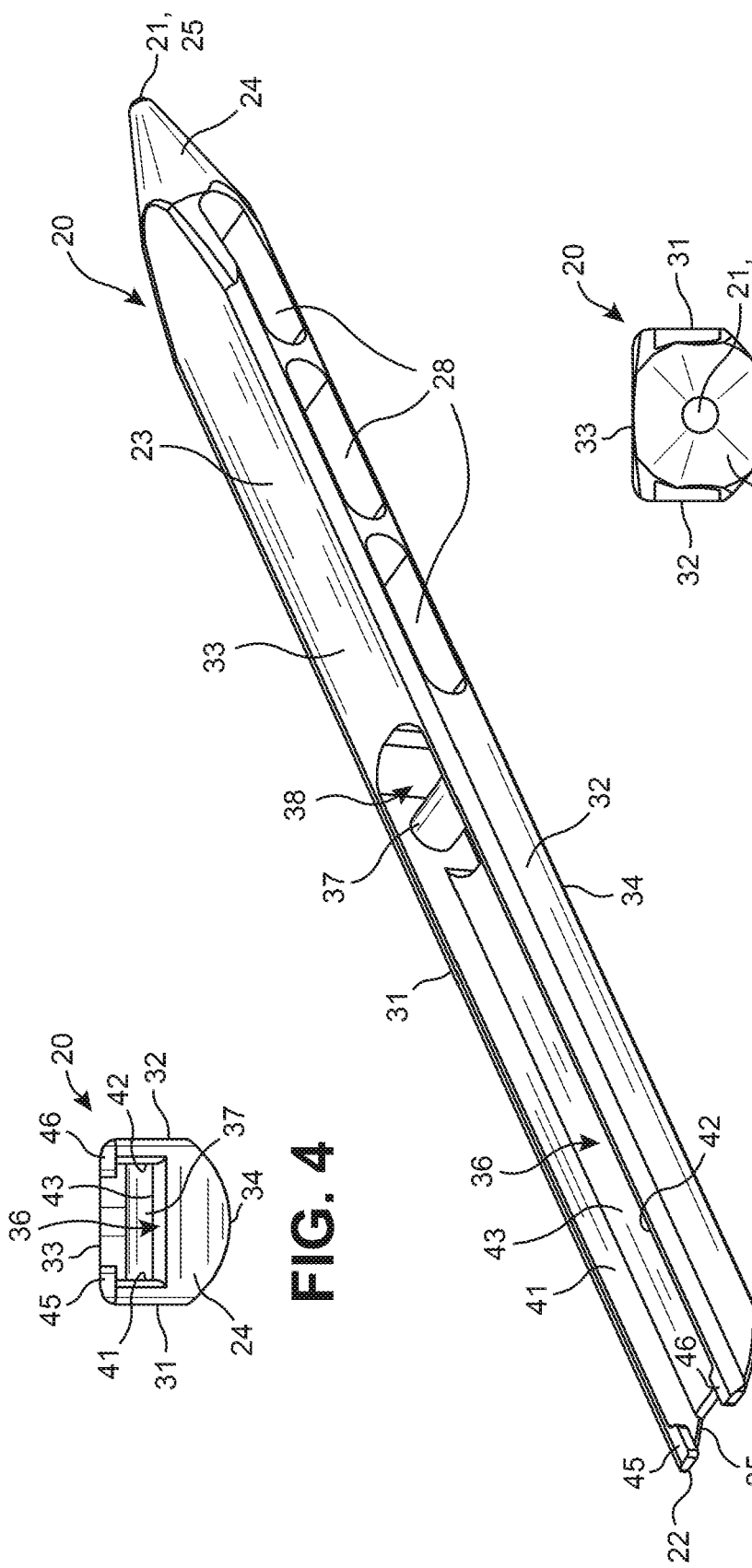

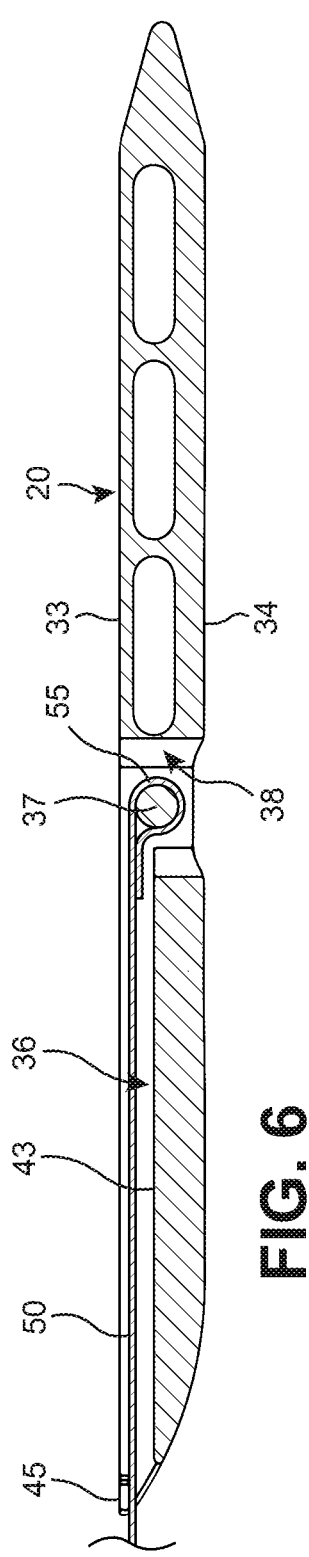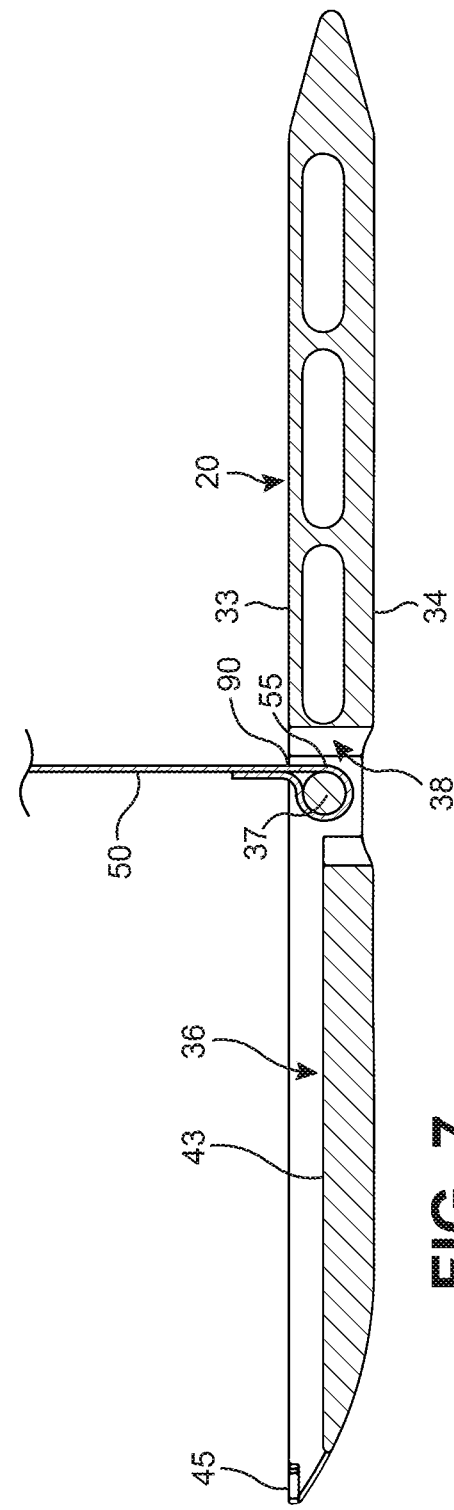

MEASURING FISH STRINGER

FIELD

The present invention relates generally to a fish stringer, and more particularly, to a fish stringer having a measuring capability.

BACKGROUND OF THE INVENTION

Fish stringers have long been used by anglers to secure freshly caught fish, typically utilizing a spear or similar device passed through the gills and/or the mouth of the fish, and often ending with a hoop to prevent the fish from escaping after being strung. However, the lack of a measuring feature on existing fish stringers restricts anglers' ability to accurately assess the size of their catch without additional tools.

It would accordingly be desirable to produce fish stringer having an integrated measuring capability.

SUMMARY OF THE INVENTION

Consistent and consonant with the present invention, an improved fishing stringer having a measuring capability has surprisingly been discovered.

According to an embodiment of the present invention, a fish stringer includes a spear having a tip for piercing a portion of a fish and a measuring tape pivotally coupled to the spear and including measurement markings thereon. At least a portion of the measuring tape extends through the portion of the fish following passage of the spear through the portion of the fish.

According to another embodiment of the present invention, a fish stringer includes a spear having a tip for piercing a portion of a fish with the spear including an axially extending channel formed therein. A tape is pivotally coupled to the spear with the tape adjustable between a first configuration and a second configuration. The first configuration includes a proximal portion of the tape received within the channel and extending in the axial direction of the spear and the second configuration includes the proximal portion of the tape pivoted away from the channel to extend transversely relative to the axial direction of the spear.

According to another embodiment of the present invention, a fish stringer includes a spear having a tip for piercing a portion of a fish and a measuring tape pivotally coupled to the spear and including measurement markings thereon. The spear includes an axially extending channel formed therein. At least a portion of the measuring tape extends through the portion of the fish following passage of the spear through the portion of the fish. The measuring tape is adjustable between a first configuration and a second configuration. The first configuration includes a proximal portion of the measuring tape received within the channel and extending in the axial direction of the spear and the second configuration includes the proximal portion of the tape pivoted away from the channel to extend transversely relative to the axial direction of the spear.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein:

FIG. 1 is a fragmentary top perspective view of a fish stringer having a measuring capability according to an embodiment of the present invention;

FIG. 2 is a fragmentary side elevational view showing a tape of the fish stringer having a first end coupled to a spear of the fish stringer and a second end optionally coupled to a clip or other coupling mechanism associated with the fish stringer;

FIG. 3 is a top perspective view showing the fish stringer of FIGS. 1 and 2 in the absence of the tape to better illustrate the structure of the spear of the fish stringer;

FIG. 4 is a rear elevational view of the spear of the fish stringer illustrated in the absence of the tape;

FIG. 5 is a front elevational view of the spear of the fish stringer illustrated in the absence of the tape;

FIG. 6 is cross-sectional view of the fish stringer as taken from the perspective of section lines 6-6 in FIG. 1, wherein the tape of the fish stringer is arranged in a first configuration where the tape extends parallel to the spear of the fish stringer; and FIG. 7 is cross-sectional view of the fish stringer as taken from the perspective of FIG. 6, wherein the tape of the fish stringer is arranged in a second configuration where the tape extends perpendicular to the spear of the fish stringer.

DETAILED DESCRIPTION OF AN EMBODIMENT

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-7 illustrate a fish stringer 10 according to an embodiment of the present invention. The fish stringer 10 generally includes a spear 20 having a tape 50 pivotally coupled thereto. The tape 50 may also be optionally associated with a hoop structure 80 at an end thereof opposite the spear 20, such as is shown in FIG. 2. The fish stringer 10 according to the present invention includes a measuring capability via the tape 50 being provided in the form of a measuring tape having markings 51 associated with performing a desired measuring process, such as measuring a recently caught fish. The tape 50 is pivotally coupled to the spear 20 to allow an adjustment of the fish stringer 10 into a configuration further securing a fish to the spear 20, or for facilitating an ease of the measuring of a fish (or other article) relative to the spear 20 and the tape 50.

The spear 20 extends longitudinally from a first end 21 to an opposing second end 22, wherein an axial direction of the spear 20 is defined between the opposing longitudinal ends 21, 22 thereof. An outer surface 23 of the spear 20 includes a tapered surface 24 tapering inwardly towards a tip 25 disposed at the first end 21 of the spear 20. The tapered surface 24 may be substantially conical in shape, as desired, although alterative inwardly tapering shapes tapering towards a substantially pointed or relatively sharp tip 25 may be utilized while remaining within the scope of the present invention, such as a substantially pyramidal shape, without necessarily departing from the scope of the present invention. The tip 25 may be provided to include a sharpness or configuration facilitating the ability to pierce a fish at a desired location, such as through the mouth or gills thereof, via manual manipulation of the spear 20. In the illustrated embodiment, the tip 25 is substantially rounded in configuration at the end of the tapered surface 24, but a sharper or more pointed tip 25 may be utilized while remaining within the scope of the present invention. As explained hereinafter, the first end 21 and the corresponding tip 25 is configured to be the leading end of the spear 20 when piercing or penetrating a fish with the tape 50 and the second end 22 of the spear 20 following through the opening formed by the tip 25 and the outward expansion of the tapered surface 24 during passage of the spear 20.

FIGS. 3-5 show the spear 20 in the absence of the tape 50 to more easily disclose the structure thereof. When proceeding rearwardly from the tapered surface 24, the outer surface 23 of the spear 20 is shown as being divided into four different surfaces 31, 32, 33, 34 about a perimeter of the spear 20 with each of the surfaces 31, 32, 33, 34 extending axially towards the second end 22 of the spear 20. The surfaces 31, 32, 33, 34 include a first lateral surface 31 formed along a first lateral side of the spear 20, a second lateral surface 32 formed opposite the first lateral surface 31 along a second lateral side of the spear 20, a first or upper connecting surface 33 extending laterally between the first and second lateral surfaces 31, 32 at what is an upper end of each of the lateral surfaces 31, 32 from the perspective of FIGS. 3-5, and a second of lower connecting surface 34 extending laterally between the first and second lateral surfaces 31, 32 at what is a lower end of each of the lateral surfaces 31, 32 from the perspective of FIGS. 3-5. However, as should be apparent, the spear 20 may be utilized in a variety of different configurations and orientations, hence the terms upper or lower are not considered limiting to the useable configurations or orientations of the spear 20.

The first lateral surface 31 and the second lateral surface 32 are shown as being substantially planar in configuration as the surfaces 31, 32 extend rearwardly from the tapered surface 24 disposed at the first end 21 of the spear 20, with each of the surfaces 31, 32 arranged substantially parallel to one another while arranged in each of the vertical direction (from the illustrated perspective) and the axial direction of the spear 20. The first or upper connecting surface 33 is also shown as being substantially planar while extending in each of the lateral direction and the axial direction of the spear 20. The second or lower connecting surface 34 is shown as being substantially convex and arcuate when extending primarily laterally between the first and second lateral surfaces 31, 32. Each transition from one of the surfaces 31, 32, 33, 34 to another adjacent one of the surfaces 31, 32, 33, 34 may include an arcuate fillet or bevel for preventing the formation of sharp axially extending edges along the spear 20. The spear 20 is, however, not limited to the disclosed configuration of the surfaces 31, 32, 33, 34, and may include alternative shapes of the perimeter or profile of the spear 20 without necessarily departing from the scope of the present invention. For example, the spear 20 may be provided to include a substantially circular or elliptical perimeter or profile shape, a rounded rectangular shape, or any combination of planar or arcuate surfaces as formed by any combination of peripherally extending surfaces while remaining within the scope of the present invention, so long as the ability of the spear 20 to stow away the tape 50 in a parallel arranged configuration is maintained (as shown with respect to FIGS. 1, 2, and 6).

The second end 22 of the spear 20 includes a tapered surface 35 having a convex and arcuate shape and a progressively decreasing vertical dimension as the tapered surface 35 extends upwardly and axially from the second or lower connecting surface 34 to the first or upper connecting surface 33, wherein the tapered surface 35 intersects the first or upper connecting surface 33 at the second end 22 of the spear 20. That is, a curvature of the tapered surface 35 occurs about a laterally extending axis such that the spear 20 is tapered to decrease in dimension only in the vertical direction and not in the lateral direction when progressing rearwardly towards the second end 22, in contrast to the conical tapered surface 24 formed at the first end 21.

The spear 20 includes a channel 36 formed therein for forming an open space within the spear 20 for stowing a proximal portion of the tape 50 when the tape 50 is arranged into the parallel-arranged configuration of FIGS. 1, 2, and 6. The channel 36 is formed in the spear 20 as an indentation in the first or upper connecting surface 33 penetrating the spear 20 towards the opposing second or lower connecting surface 34 with respect to the illustrated vertical direction with the indentation formed intermediate the opposing first and second lateral surfaces 31, 32. The indentation formed by the channel 36 extends from the second end 22 of the spear 20 towards the first end 21 thereof. The channel 36 is defined by a first lateral surface 41 thereof formed immediately adjacent and opposite the first lateral surface 31 of the outer surface 23 of the spear 20, a second lateral surface 42 thereof formed immediately adjacent and opposite the second lateral surface 32 of the outer surface 23 of the spear 20, and a base surface 43 connecting the first lateral surface 41 to the second lateral surface 42 at a base of the channel 36 spaced apart a maximum vertical distance from the first or upper connecting surface 33 of the outer surface 23 of the spear 20, wherein the base surface 43 extends in the axial and lateral directions of the spear 20. The channel 36 is shown in FIG. 4 as having a substantially rectangular cross-sectional shape extending forward from the second end 22 until the channel 36 terminates axially prior to reaching the first end 21 thereof. A lateral width of the channel 36 is selected to be greater than that of the tape 50 to allow the tape 50 to be received within the channel 36 without being compressed between the facing lateral surfaces 41, 42 defining the channel 36.

A substantially cylindrical shaft 37 extends laterally across the channel 36 from the first lateral surface 41 to the opposing lateral surface 42 thereof. The shaft 37 defines an axis of rotation of the pivoting of the tape 50 at a position within the spear 20. Specifically, the axis of rotation defined by the shaft 37 is disposed along a laterally and vertically extending plane dividing a mass of the spear 20 into two equal portions with respect to each axial side of the described plane such that the spear 20 is balanced about a laterally extending axis passing through the plane. In some embodiments, a central axis of the shaft 37 may be centered on a laterally extending axis arranged on the described plane and further passing directly through a center of mass of the spear 20, which further includes the shaft 37 being arranged to divide the mass of the spear 20 into equal portions with respect to the vertical direction. In either event, the shaft 37 is positioned to allow the spear 20 to be balanced about the shaft 37 when the spear 20 is arranged horizontally, such as when the spear 20 is suspended from the tape 50 when the tape 50 is arranged vertically (FIG. 7). The channel 36 may accordingly be formed to extend axially to a position beyond the described mass dividing plane to accommodate the inclusion of the shaft 37 for pivotally coupling the tape 50 to the spear 20 in the manner described.

The spear 20 may include a through opening 38 at the end of the channel 36 having the shaft 37 such that the through opening 38 and the channel 36 cooperate to form a substantially L-shaped and continuous open space within the spear 20. Specifically, the through opening 38 extends through the spear 20 from the upper connecting surface 33 to the opposing lower connecting surface 34 with the shaft 37 extending across the through opening 38 at a position beyond an end of the base surface 43 of the channel 36.

The spear 20 may include one or more mass reduction openings 28 formed therein for reducing a mass of the spear 20 and for distributing the mass of the spear 20 equally to each side of the shaft 37 in the manner described above. In the current embodiment, three of the mass reduction openings 28 are formed laterally through the spear 20 to a side of the shaft 37 including the first end 21, which balances the spear 20 as a result of the presence of the open-spaced channel 36 in the spear 20 to the opposing side of the shaft 37. However, alternative configurations of the mass reduction openings 28 may be utilized without necessarily departing from the scope of the present invention so long as the spear 20 is balanced in the manner described.

The spear 20 further includes a pair of retaining structures 45, 46 configured to maintain the tape 50 within the channel 36 when the fish stringer 10 is adjusted to the parallel-arranged configuration of the tape 50 and the spear 20 as shown in FIGS. 1, 2, and 6. The retaining structures 45, 46 include a first retaining structure 45 provided as a protrusion extending laterally over the channel 36 from an upper edge of the first lateral surface 41 (disposed along the upper connecting surface 33) in a direction towards the opposing second lateral surface 42 and a second retaining structure 46 provided as a protrusion extending laterally over the channel 36 from an upper edge of the second lateral surface 42 (disposed along the upper connecting surface 33) in a direction towards the opposing first lateral surface 41. Each of the protrusions extends axially along only a minor portion of the axial length of the channel 36 to allow for manipulation of the tape 50 intermediate the shaft 37 and the retaining structures 45, 46, such as when stowing the tape 50 into the channel 36 or removing the tape 50 from the channel 36. The retaining structures 45, 46 extend laterally inwardly over the channel 36 to result in a lateral distance present between the laterally innermost surfaces of the opposing retaining structures 45, 46 being less than a lateral distance present between the opposing first and second lateral surfaces 41, 42. The retaining structures 45, 46 are preferably disposed towards the second end 22 of the spear 20 to retain the tape 50 at a position spaced apart from the shaft 37, thereby ensuring that a greater length of the tape 50 is maintained in parallel relative to the axial direction of the spear 20.

The tape 50 is provided as a form of measuring tape having a rectangular cross-sectional shape with a length of the tape (corresponding to the axial direction of the spear 20 when the tape 50 is arranged in the channel 36 and parallel to the spear 20) and a width of the tape (corresponding to the lateral direction of the spear 20 when the tape 50 is arranged in the channel 36 and parallel to the spear 20) far exceeding a thickness of the tape 50 (corresponding to the vertical direction of the spear 20 when the tape 50 is arranged in the channel 36 and parallel to the spear 20). A width of the tape 50 is selected to be less than the lateral distance present between the opposing lateral surfaces 41, 42 defining the channel 36 and greater than the lateral distance present between the laterally innermost disposed surfaces of the opposing retaining structures 45, 46. The tape 50 is formed from a pliable sheet-like material capable of being bent or twisted around various different axes as is typical of the tape of a standard tape measure. The sheet-like material may be a flexible polymeric material, such as a suitable plastic.

The tape 50 includes a plurality of longitudinally spaced apart markings 51 for indicating a distance along the tape 50 from an origin 90 disposed along the tape 50. The markings 51 are shown in FIG. 1 as corresponding to whole and half inch intervals, but any interval of any unit of measurement may be utilized while remaining within the scope of the present invention. The tape 50 may have any desired length and may include the markings 51 along a portion or an entirety of the length of the tape 50, as desired. As non-limiting examples, the tape 50 may be provided to be 8 feet or 16 feet in length.

The origin 90 from which the value of each of the markings 51 is counted may be selected to correspond to a position along the tape 50 corresponding to a plane of the first or upper connecting surface 33 when the tape 50 is adjusted to the configuration of FIG. 7 where the tape 50 is arranged perpendicular to the spear 20. This positioning of the origin 90 allows for measurements to be made relative to the exposed and facing upper connecting surface 33 of the spear 20 when the tape 50 is pulled taught away from the shaft 37, such as when the spear 20 is suspended from the tape 50 with the tape 50 arranged vertically in the direction of the force of gravity and the spear 20 arranged horizontally and perpendicular to the extension of the tape 50. In other embodiments, the origin 90 may alternatively be selected to correspond to the position of the axis of rotation of the tape 50 as defined by the central axis of the shaft 37, or may correspond to the plane of the second or lower connecting surface 34 when the tape 50 is arranged in the configuration of FIG. 7, as non-limiting alternatives. In some embodiments, the tape 50 may include multiple different sets of markings 51 corresponding to distance values relative to two or more different origins 90, such as one set of markings 51 showing measurements relative to the plane of the upper connecting surface 33 and another set of markings 51 showing measurements relative to the plane of the lower connecting surface 34, thereby facilitating the ability to make measurements relative to the upper or lower exposed surfaces of the spear 20 when attempting to measure different articles.

The tape 50 may be pivotally coupled to the shaft 37 by wrapping a looped proximal end 55 of the tape 50 around the shaft 37 in a manner allowing the pivotal sliding of the proximal end 55 around the shaft 37 for reorienting the tape 50 relative to the spear 20. The proximal end 55 may be formed into a loop by coupling an end of the tape 50 to a spaced apart portion of the tape 50 to form an opening therebetween. The end of the tape 50 may be coupled to the spaced apart portion of the tape 50 via any suitable coupling method, including any form of heat welding, such as utilizing radio frequency (RF) welding relative to a tape formed from a polymeric material suitable for being joined via the corresponding RF welding process. However, alternative coupling methods may be utilized without departing from the scope of the present invention, including the use of rivets, shrink-tubing, adhesives, fasteners, or the like.

A distal end 56 of the tape 50 formed opposite the proximal end 55 thereof is shown in FIG. 2 as being removably coupled to a representative hoop structure 80 of the fish stringer 10. The distal end 56 of the illustrated embodiment is formed into a loop in similar fashion to the proximal end 55, but the distal end 56 may alternatively include any structure or configuration for coupling the tape 50 to one of the hoop structures 80 while remaining within the scope of the present invention. The hoop structure 80 may be formed by any hooped, looped, or closed polygonal shape capable of receiving the spear 20 therethrough for forming a slip-knot of the tape 50. The hoop structure 80 is shown in FIG. 2 as a form of shark clip, but alternative hooped structures may be utilized, including a simple metal ring or the like or a loop formed directly in the distal end 56 of the tape 50, without departing from the scope of the present invention. In some embodiments, the distal end 56 of the tape 50 and/or the corresponding hoop structure 80 disposed thereat may be further coupled to or otherwise associated with a float (not shown) for causing the distal end 56 of the tape 50 to float when the fish stringer 10 is utilized in a body of water.

The through opening 38 of the spear 20 may be utilized for feeding the tape 50 therethrough in a direction opposing that shown and described for causing the tape 50 to extend in a direction away from the lower connecting surface 34 after an entirety of the tape 50 has passed therethrough, or for causing only a looped portion of the tape 50 to extend outside of the through opening 38 and beyond the lower connecting surface 34. For example, as shown in FIGS. 6 and 7, it should be apparent that rotation of the tape 50 around the shaft 37 may result in a reorientation of the tape 50 to extend through the through opening 38 in either vertical direction, thereby allowing for an adjustment of the tape 50 to alternative configurations relative to the spear 20. The readjustment of the tape 50 in the manner described may include the removal of the hoop structure 80 from the distal end 56 of the tape 50 prior to feeding the tape 50 through the through opening 38.

In use, a fish may be strung onto the fish stringer by first adjusting the tape 50 to the parallel-arranged configuration of FIG. 6 with a proximal portion of the tape 50 extending away from the shaft 37 within the channel 36. The flexibility of the tape 50 includes the ability to flex the tape 50 into a configuration wherein the opposing edges along the width (lateral) direction of the tape 50 are brought closer to one another, such as by curling, curving, or twisting the tape 50 into an arcuate configuration. The tape 50 is thus able to be received between the base surface 43 and an underside of each of the retaining structures 45, 46 when the tape 50 is flexed to a configuration wherein the opposing edges thereof are spaced apart from one another by a distance less than the distance present between the laterally innermost surfaces of the facing retaining structures 45, 46 during manual manipulation of the tape 50 relative to the spear 20. Once released, the tape 50 includes a resiliency causing the tape 50 to attempt to return to a rectangular cross-sectional shape with the opposing edges thereof once again spaced apart from one another by a distance greater than the distance present between the laterally innermost surfaces of the retaining structures 45, 46. The tape 50 is accordingly stowed away within the channel 36 in a manner wherein the tape 50 does not project outside of the profile of the spear 20 between the first and second ends 21, 22 thereof, which aids in smoothly passing the spear 20 and tape 50 through a fish or other penetrated structure or body.

When in the configuration of FIG. 6, the tip 25 of the spear 20 may be pierced through a corresponding portion of a fish, such as through the gills or lips thereof, with the remainder of the spear 20 progressing through the newly formed opening until the spear 20 is through the portion of the fish with the tape 50 extending rearwardly from the second end 22 of the spear 20 and a portion of the tape 50 disposed through the newly formed opening within the portion of the fish. The spear 20 and the proximal end 55 of the tape 20 are accordingly disposed to a first side of the opening formed within the fish (following passage therethrough) while the distal end 56 of the tape 50 having the hoop structure 80 is disposed to a second side of the opening formed within the fish (and absent passage therethrough). Once in this state, the spear 20 can be fed through the hoop structure 80 to result in the formation of a slipknot and a looped portion of the tape 50 extending through the opening formed in the fish, thereby retaining the fish on the fish stringer 10.

Following passage of the spear 20 through the portion of the fish, the spear 20 may be optionally adjusted from the parallel-arranged configuration of FIG. 6 with the tape 50 stowed within the channel 36 to a non-parallel-arranged configuration with the tape 50 removed from the channel 36 and pivoted to a configuration transverse relative to the spear 20, including (but not limited to) the perpendicular-arranged configuration of FIG. 7. The adjustment of the fish stringer 10 away from the stowed configuration includes the user manually manipulating the tape 50 to once again be reduced in width to allow the tape 50 to pass beyond the retaining structures 45, 46 for removal from the channel 36. The adjustment of the tape 50 to the non-parallel and non-stowed configuration offers the benefit of further preventing removal of the spear 20 from either of the opening formed within the fish or the hoop structure 80, depending on the circumstances, thereby further securing the fish to the fish stringer 10 via the interference of the transversely-arranged spear 20 relative to either of the fish opening or the hoop structure 80.

As described above, the ability to pivot the tape 50 relative to the spear 20 may facilitate the ability to create multiple different configurations of the fish stringer 10 for performing a desired measurement, such as utilizing one of the surfaces 33, 34 of the spear 20 to locate the fish or other item being measured relative to the tape 50. For example, the spear 20 hangs horizontally relative to a vertically arranged tape 50 when in the configuration of FIG. 7, which forms a horizontal surface of the spear 20 against which an item can be located for performing a measurement. The horizontal arrangement of the spear 20 when suspended from the tape 50, as a result of the balancing of the spear 20 about the shaft 37, also allows the spear 20 to remain horizontal when the spear 20 is submerged in water with the tape 50 extending upwardly, thereby maintaining the non-parallel and fish retaining configuration of FIG. 7.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fish stringer comprising:
   a spear having a tip for piercing a portion of a fish, the spear including an axially extending channel formed therein; and
   a tape pivotally coupled to the spear, the tape adjustable between a first configuration and a second configuration, wherein the first configuration includes a proximal portion of the tape received within the channel and extending in the axial direction of the spear, and wherein the second configuration includes the proximal portion of the tape pivoted away from the channel to extend transversely relative to the axial direction of the spear, wherein the spear includes at least one retaining structure for preventing undesired removal of the proximal portion of the tape from within the channel when the tape is in the first configuration, wherein the at least one retaining structure includes a first retaining structure projecting over the channel from a first lateral side of the channel and a second retaining structure projecting over the channel from a second lateral side of the channel.

2. The fish stringer of claim 1, wherein the spear extends axially from a first end to a second end thereof, wherein the tip is formed at the first end of the spear and the channel extends to the second end thereof.

3. The fish stringer of claim 1, wherein a shaft of the spear extends laterally across the channel, and wherein a proximal end of the tape is pivotally coupled to the shaft of the spear.

4. The fish stringer of claim 1, wherein an axis of rotation of the tape where the tape is pivotally coupled to the spear is disposed within the channel.

5. The fish stringer of claim 1, wherein a lateral width of the channel is greater than a lateral width of the tape, and wherein the lateral width of the tape is greater than a lateral distance present between the first retaining structure and the second retaining structure.

6. The fish stringer of claim 5, wherein the tape is flexible in a manner allowing the tape to pass between the first retaining structure and the second retaining structure when the tape is adjusted between the first configuration and the second configuration.

7. The fish stringer of claim 6, wherein the tape is flexible in a manner allowing the tape to be curved to reduce a distance between opposing edges of the tape when passing the tape between the first retaining structure and the second retaining structure.

8. A fish stringer comprising:
a spear having a tip for piercing a portion of a fish, the spear including an axially extending channel formed therein;
a measuring tape pivotally coupled to the spear and including measurement markings thereon, at least a portion of the measuring tape extending through the portion of the fish following passage of the spear through the portion of the fish, the measuring tape adjustable between a first configuration and a second configuration, wherein the first configuration includes a proximal portion of the measuring tape received within the channel and extending in the axial direction of the spear, and wherein the second configuration includes the proximal portion of the measuring tape pivoted away from the channel to extend transversely relative to the axial direction of the spear, wherein the spear includes at least one retaining structure for preventing undesired removal of the proximal portion of the tape from within the channel when the tape is in the first configuration, wherein the at least one retaining structure includes a first retaining structure projecting over the channel from a first lateral side of the channel and a second retaining structure projecting over the channel from a second lateral side of the channel.

9. A fish stringer comprising:
a spear having a tip for piercing a portion of a fish, the spear including an axially extending channel formed therein; and
a tape pivotally coupled to the spear, the tape adjustable between a first configuration and a second configuration, wherein the first configuration includes a proximal portion of the tape received within the channel and extending in the axial direction of the spear, and wherein the second configuration includes the proximal portion of the tape pivoted away from the channel to extend transversely relative to the axial direction of the spear, wherein a shaft of the spear extends laterally across the channel, and wherein a proximal end of the tape is pivotally coupled to the shaft of the spear.

* * * * *